United States Patent [19]
Rudolf et al.

[11] Patent Number: 5,445,413
[45] Date of Patent: Aug. 29, 1995

[54] METHOD FOR RELEASING AN AIRBAG IN A MOTOR VEHICLE

[75] Inventors: Harald Rudolf, Tuebingen; Guido Wetzel, Neuburg/Donau; Manfred Mueller, Deizisau, all of Germany

[73] Assignee: Mercedes-Benz AG, Stuttgart, Germany

[21] Appl. No.: 304,659

[22] Filed: Sep. 9, 1994

[30] Foreign Application Priority Data

Sep. 9, 1993 [DE] Germany .................. 43 30 486.9

[51] Int. Cl.$^6$ .................. B60R 21/32; G01P 15/00; G01D 1/04
[52] U.S. Cl. .................. 280/735; 180/268; 364/424.05
[58] Field of Search .................. 280/735; 180/268

[56] References Cited

U.S. PATENT DOCUMENTS 4,985,835  1/1991  Sterler et al. .................. 364/424.05
5,014,810  5/1991  Mattes et al. .................. 180/268

FOREIGN PATENT DOCUMENTS 0458796  11/1992  European Pat. Off. .
3803426   8/1989  Germany .
4128230   5/1992  Germany .
2246893   2/1992  United Kingdom .
WO90/11207 10/1990 WIPO .

*Primary Examiner*—Kenneth R. Rice
*Attorney, Agent, or Firm*—Evenson McKeown Edwards & Lenahan

[57] ABSTRACT

A method and system for releasing an airbag in a motor vehicle utilizes an acceleration signal which is measured and processed for the formation of a release criterion. An impact causes an initial increase in the release readiness, which is cancelled after a short period of time if no release has taken place up to that time. In particular in the case of impact processes with moderate acceleration values, such as for example in an offset pole crash, there is the risk that the airbag is released so late that an occupant who has already been substantially displaced forwards towards the steering wheel is additionally endangered by the explosive opening of the airbag. The cancellation of the increased release readiness is controlled by a state variable which corresponds to the forward displacement of an occupant and is obtained by double integration from the acceleration signal with respect to time. The cancellation takes place when the forward displacement exceeds a critical value.

8 Claims, 1 Drawing Sheet

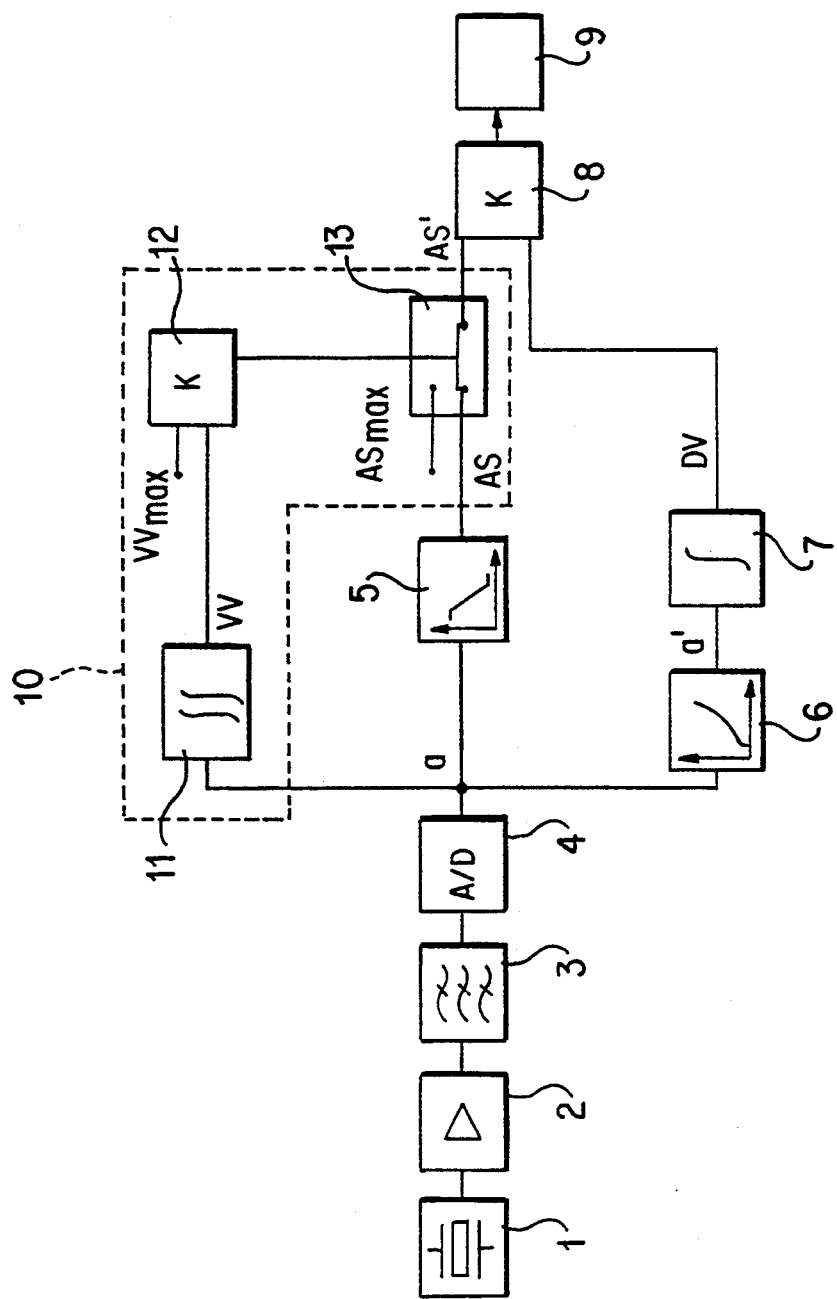

METHOD FOR RELEASING AN AIRBAG IN A MOTOR VEHICLE

BACKGROUND AND SUMMARY OF THE INVENTION

The invention relates to a method for releasing an airbag in a motor vehicle, in which for the formation of a release decision a plurality of state variables are derived in parallel from an acceleration signal and the airbag is released when a first state variable exceeds a threshold value, influenced by a second state variable, the threshold value being lowered as soon as the second state variable indicates an impact of the vehicle.

A method of this kind is known from European Patent Document EP 458 796 B1 in which restraining means, in particular an airbag, are activated when the integrated output signal of an acceleration sensor exceeds a threshold, the so-called DV threshold. The integrated acceleration represents the velocity change DV, calculated from the start of the impact situation. To adapt to fast and slower crash patterns, various methods for influencing the release characteristics are shown; in particular, the DV threshold is varied as a function of time and/or acceleration. In the case of a high output signal of the acceleration sensor, arming the release readiness is thus achieved through a corresponding lowering of the DV threshold, as a result of which a necessarily very fast release can be carried out in time. To adapt to crash processes with moderate delays, a DV threshold is provided which becomes less sensitive with time, as a result of which, inter alia, a release is prevented if a release of the restraining means would occur too late for a corresponding restraining effect on the passengers. The prevention or desensitization, controlled by a time element, of or for a release is unsatisfactory since no direct physical interrelationship exists with the crash action.

In particular in the case of an offset pole crash with a low degree of overlap, in which no frame side rail of the vehicle is hit, the registered acceleration values lie, for comparable initial speeds, between those of a hard braking involving overrunning the kerbstone (curb) and a head-on crash into a wall. In this area, it is difficult to detect reliably a dangerous impact and to differentiate it from, for example, a hard braking involving overrunning the kerbstone. The release decision therefore requires a greater length of time for the evaluation of the acceleration. While a fast release is of prime importance for fast crash patterns, the release decision for slower crash patterns must also be guided by the consideration that an excessively late release of the airbag has to be prevented so that an occupant whose head has already come very close to the steering wheel is not additionally endangered by the suddenly inflating airbag.

German Patent Document DOS 38 03 426 discloses a method for switching a safety system to be effective, in which the forward displacement of the occupants which occurs during an accident is calculated in the vehicle coordinate system from the signal of an acceleration L pick-up. When the calculated forward displacement exceeds a predeterminable value, a safety device is activated, for example an airbag is inflated. Theoretically such a I method ensures that the airbag is triggered precisely at the right moment. Triggering at a point in time at which the head of the occupant is already hitting the steering wheel would not occur at all. A big disadvantage of this method is, however, that, due to the comparatively great inflation time of the airbag of approximately 30 msec, the decision to release has already to be taken during the initial phase of the crash process, while at this time, however, the forward displacement of the occupants, used as release criterion, can be calculated only very inaccurately from the acceleration values available up to that time.

It is an object of the invention to improve the desensitization of a release unit, shifted to a higher degree of release readiness as a result of impact, for a generic method for airbag release. In consequence, occupants are to be better protected against not only an excessively late release of the airbag but also one which endangers these occupants.

This object is solved by means of the a method of the above referred to type wherein the threshold value is also influenced by a third state variable derived from the acceleration signal and corresponding to the forward displacement of the occupant, by increasing the threshold value as the forward displacement increases. In an advantageous manner, the desensitization of the release unit is coupled to the real crash process by determining the forward displacement of the occupants and using it to control the desensitization of the release unit. Triggering the airbag at a point in time at which the head of the occupant is already located very close to the steering wheel can be effectively prevented in this way.

While the forward displacement provides no suitable state variable for determining the timing of the release, as described above, it can still be used to control the desensitization which need only set in at a later phase of the crash process. In contrast to the German Patent Document DOS 38 03 426 mentioned above, the forward displacement need not be calculated in advance by a time equivalent to the inflation time of the airbag. It is sufficient to calculate the current forward displacement, which can be determined in a simpler and more accurate way since the desensitization of the armed release circuit can be linked to the simple criterion of whether the current forward displacement exceeds a maximum value above which a release is unwanted.

Other objects, advantages and novel features of the present invention will become apparent from the following detailed description of the invention when considered in conjunction with the accompanying drawings.

BRIEF DESCRIPTION OF THE DRAWING

The single drawing FIGURE schematically illustrates a release circuit for carrying out the method according to the invention.

DETAILED DESCRIPTION OF THE DRAWING

The release circuit shown in the FIGURE consists of a circuit part known per se also from the above-mentioned publications, having the components 1 to 9 and a circuit part 10 according to the invention inside the block framed by a broken line. A piezo pick-up 1 measures the acceleration of the vehicle in the longitudinal direction. A corresponding signal is processed in an amplifier 2 and a filter stage 3 and possibly supplied to an analog-digital converter 4 in the case of further digital processing, which analog-digital converter emits an acceleration signal a. In a first path the acceleration signal a is weighted in a non-linear element 6 and the acceleration signal a' thus assessed is converted into a velocity signal DV by means of an integrator 7. This DV signal is routed to a first comparator 8 which, when the DV signal exceeds a release threshold, emits a release signal to a final triggering stage 9 of the airbag. In a second path, the acceleration signal a is routed to a threshold value generator 5 which presets a release threshold AS, influenced by the acceleration signal a, for the first comparator 8.

According to the European Patent EP 458 796 B1, the influence can take place in such a manner that, starting from a relatively high basic threshold, the release threshold AS is temporarily lowered at an increasing rate of acceleration a to a lower threshold. On the whole, this results in arming the release readiness in the case of high acceleration values a.

According to the invention, in a third path, the acceleration signal a is now evaluated by the circuit part 10 framed by a broken line, to modify the release threshold AS produced by the threshold value generator 5 and to preset a resulting release threshold AS' for the first comparator 8.

For this purpose, the forward displacement VV of the occupant, which has occurred since the beginning of the impact as a result of the acting acceleration forces, is determined from the acceleration signal a, essentially by double integration with respect to time in an evaluation stage 11. This value VV is compared with a maximum value $VV_{max}$ in a second comparator 12. When the forward displacement VV exceeds this maximum value $VV_{max}$, the comparator 12 emits a control signal to a selector stage 13 which then switches over from the release threshold AS to a maximum release threshold $AS_{max}$. The resulting release threshold AS' is thereby raised so that the emission of a release signal by the subsequent first comparator 8 is made more difficult. Raising the release threshold AS' need not take place abruptly, but can also take place continuously as a function of the forward displacement VV.

The maximum release threshold $AS_{max}$ can coincide with the basic threshold as predetermined in the basic state by the threshold value generator 5. In a development it would also be appropriate to predetermine a value of $AS_{max}$ far above the basic threshold so that a release is suppressed with high reliability. So that the release circuit also reacts to a subsequent collision, it can be furthermore provided that the inhibition of the release lasts only for a specified masking time, after the expiry of which the selector stage 13 switches the resulting release threshold AS' to the threshold AS again and the release circuit is again reset to the basic state.

For a useful examination of the forward displacement it is necessary to restore the calculated path VV in a manner that takes into account the automatic backward motion of the upper part of the body when it is force free. In this case, force-free means that the acceleration signal a falls below a predetermined threshold value of, for example, 2 g, that is to say double the acceleration due to gravity. The restoration prevents an unwanted desensitization of the release circuit setting in, for example, after a hard braking on a rough road or going over a kerbstone, since the calculated forward displacement would have reached the threshold $VV_{max}$ after sometime. In the evaluation stage 11 provision is therefore made for a linear return of the forward displacement VV at a predetermined velocity of the order of magnitude of 1 m/sec. By means of a limit for the VV signal a limit stop for the forward displacement also has to be provided in the evaluation stage 11, which limit stop corresponds to the distance between the head and the steering wheel. Based thereon, it is appropriate that, when the forward displacement VV is again smaller than $VV_{max}$, due to the restoration, the control signal, which is now reset and emitted from the second comparator 12 to the selector stage 13, switches back the resulting release threshold AS' to the value AS.

The circuit part 10 according to the invention can be completely integrated into the threshold generator and regarded as part thereof, according to certain preferred embodiments of the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for releasing an airbag in a motor vehicle, in which for the formation of a release decision a plurality of state variables are derived in parallel from an acceleration signal and the airbag is released when a first state variable exceeds a threshold value, influenced by a second state variable, the threshold value being lowered as soon as the second state variable indicates an impact of the vehicle, wherein the threshold value is also influenced by a third state variable derived from the acceleration signal and corresponding to the forward displacement of the occupant, by increasing the threshold value as the forward displacement increases.

2. Method according to claim 1, wherein the threshold value abruptly increases as soon as the forward displacement exceeds a critical value.

3. Method according to claim 1, wherein the first state variable corresponds to a velocity DV and is obtained by integration of the acceleration signal with respect to time.

4. Method according to claim 1, wherein, for the formation of the forward displacement, the acceleration signal is twice integrated with respect to time and limited to a value which corresponds to a normal distance between the head of the occupant and the steering wheel and the double integral of the acceleration signal, thus limited, is reset in accordance with a predetermined time function each time the acceleration signal falls below a threshold.

5. Method according to claim 4, wherein a raising of the threshold value, caused by the forward displacement formed, is cancelled as soon as the forward displacement falls below a lower threshold.

6. Device for carrying out a method for releasing an airbag in a motor vehicle, in which for the formation of a release decision a plurality of state variables are derived in parallel from an acceleration signal and the airbag is released when a first state variable exceeds a threshold value, influenced by a second state variable, the threshold value being lowered as soon as the second state variable indicates an impact of the vehicle, wherein the threshold value is also influenced by a third state variable derived from the acceleration signal and corresponding to the forward displacement of the occupant, by increasing the threshold value as the forward displacement increases, said device comprising:

a comparator controlling a final triggering stage of an airbag, a threshold value AS' being present at one input of the comparator and a velocity signal DV, derived from the acceleration signal of an acceleration sensor, is present at the other input, wherein the threshold value AS' is preset by a switching stage for the comparator, which threshold value, as a function of a control signal, lies between a lower release threshold AS and a maximum release threshold $AS_{max}$, the lower release threshold AS being preset by a threshold value generator, which likewise evaluates the acceleration signal, in the manner that after an impact the lower release threshold AS is reduced, the control signal being preset by a second comparator which compares a forward displacement VV, determined from the acceleration signal, with a maximum value $VV_{max}$ and, in the case where the latter is exceeded, emits a control signal which increases the threshold value AS'.

7. Device according to claim 6, wherein the switching stage presets a threshold value AS' which, as a function of the control signal, corresponds to the lower release threshold AS or to the maximum release threshold $AS_{max}$.

8. A system for controlling release of an airbag in a motor vehicle, comprising:

release decision formation means in which a plurality of state variables are derived in parallel from a vehicle acceleration signal and the airbag is released when a first state variable exceeds a threshold value, influenced by a second state variable, the threshold value being lowered as soon as the second state variable indicates an impact of the vehicle, and means for influencing the threshold value as a function of a third state variable derived from the acceleration signal and corresponding to the forward displacement of the occupant, by increasing the threshold value as the forward displacement increases.

* * * * *